219-121.    SR
06-28-71    OR    3,588,463

United States Patent    [11] 3,588,463

| [72] | Inventor | Stanley G. Best |
| | | Manchester, Conn. |
| [21] | Appl. No. | 855,870 |
| [22] | Filed | Sept. 8, 1969 |
| [45] | Patented | June 28, 1971 |
| [73] | Assignee | United Aircraft Corporation |
| | | East Hartford, Conn. |

[54] METHOD AND APPARATUS FOR TRACKING A SEAM
7 Claims, 8 Drawing Figs.

[52] U.S. Cl. .................................................. 219/121EB, 318/18
[51] Int. Cl. .................................................... B23k 15/00
[50] Field of Search .................................... 219/121, 121 (EB), 125; 318/18

[56] References Cited
UNITED STATES PATENTS

| 3,017,552 | 1/1962 | Brouwer | 318/39 |
| 3,204,081 | 8/1965 | Iceland | 219/125 |
| 3,268,805 | 8/1966 | Normando | 324/37 |
| 3,308,264 | 3/1967 | Ullery | 219/121 |
| 3,418,548 | 12/1968 | Raphael | 318/18 |
| 3,426,174 | 2/1969 | Graham et al. | 219/121 |

*Primary Examiner*—J. W. Truhe
*Assistant Examiner*—R. E. O'Neill
*Attorney*—John C. Linderman ABSTRACT: Apparatus and methods are disclosed which permit a weld seam between two workpieces to be automatically tracked. Provisions are included for tracking at a substantially constant linear speed in the direction of the seam regardless of the direction of the seam in the pieces. An electron beam is swept in a closed path about a desired workpoint and the intersection of the path and the seam is used to determine the directional character of the seam. The beam and the workpieces are then moved relative to one another in the direction defined by the intersections. By sweeping the beam across the seam at a position displaced from the workpoint, information concerning the direction of the seam can be employed to control the movement of the workpieces with respect to the tracking beam or a welding beam at substantially constant speeds.

METHOD AND APPARATUS FOR TRACKING A SEAM

BACKGROUND OF THE INVENTION

This invention relates to working materials with an intense beam of charged particles. More particularly, the invention is directed to tracking an irregular or tortuous seam at a constant speed.

The invention has particular utility in an electron beam machine. Electron beam machines, as they are generally known, are devices which use the kinetic energy of an electron beam to work a material. U.S. Pat. No. 2,987,610, issued June 6, 1961, to K. H. Steigerwald, discloses such a machine. These machines operate by generating a highly focused beam of electrons. The electron beam is a welding, cutting and machining tool which has practically no mass but has high kinetic energy because of the extremely high velocity imparted to the electrons. Transfer of this kinetic energy to the lattice electrons of the workpiece generates higher lattice vibrations which cause an increase in the temperature within the impingement area sufficient to accomplish work. In fact, the temperature becomes so high that the material either melts or evaporates.

In welding with an intense beam of charged particles, it is desirable to maintain a constant welding speed. As in most welding processes, the depth of penetration of the weld depends on the total power delivered to the workpieces per unit length of the weld. The higher the power per unit length of weld, the greater the quantity of molten material formed. With deeper welds, greater powers are demanded. For welds of constant depth, the energy delivered per unit length of weld should remain constant. Consequently, if a high energy beam operating at constant power is used to form the weld, it is preferred that the welding speed, or the rate at which material is melted, be held constant to maintain the weld at a uniform depth.

Where the weld seam is irregular or follows a tortuous path, special controls are necessary to maintain a constant relative speed between a high intensity welding beam and the workpieces.

In the prior art, it is known to sweep a low intensity beam periodically across a seam to locate and reposition the seam under the beam. U.S. Pat. No. 3,204,081 discloses such a system in which the control signals for positioning the workpieces under the beam are derived from the deviation of the detected seam from the center of the sweep deflections. The workpiece is moved in the direction of the seam, longitudinally, at a constant speed and consequently variations in a welding speed along the seam would exist if an additional movement transverse to the seam were combined with the longitudinal movement to follow an irregular seam.

A device concerned with tracing and tracking an irregular work path is disclosed in U.S. Pat. No. 3,418,548. In this patent, a device is provided which permits welding or other machining operations along an irregular path at a constant speed. The constant speed factor is obtained by special recording equipment and processes. It is necessary to perform distinct recording and playback operations at distinct and separated periods of time. In addition, the equipment employed is comparatively sophisticated and expensive. It is desirable to perform the tracking operation simultaneously with the welding operation and with less expensive equipment.

SUMMARY OF THE INVENTION

This invention provides seam tracking features which permit automatic and continuous seam following. The invention employs both novel methods and apparatus to achieve the automatic seam tracking features.

A low intensity energized beam is swept along a known path crossing the seam at a position advanced from a known workpoint on the workpieces. The sweep of the beam across the beam at the intersection of the path and seam is detected and the intersection is located by a correlation of the beam impingement at the intersection with the known position of the beam on its sweep path. After the location of the seam from the workpoint is determined, relative movement of the beam and workpieces is caused in response to the positional information derived from the beam sweep correlations.

In one embodiment of the invention, the beam remains stationary and two motors drive the workpieces under the beam. Each motor drives the workpiece in one of two orthogonal directions in response to signal outputs from phase discriminators associated with the respective directions. The speed of the motors is controlled in proportion to the components of the seam direction along the orthogonal directions to produce a constant tracking speed.

In another embodiment of the invention, the beam is swept in a circular path in the vicinity of a proposed workpoint on the seam. If the seam has not been closed by a welding beam operating at high intensity, the sweep of the beam will be detected at positions both in advance of and behind the proposed workpoint. From the sum and difference of the phase angles at which the beam is detected, it is possible to determine respectively the direction of the seam and the lateral displacement of the beam from a centered position on the seam. By suitably driving the beam and the motors controlling workpiece movement, the seam can be tracked at a generally constant speed and the beam can be kept centered on the seam. In this process it is possible to record the commands to the control motors and beam at each point along the seam. By playing the tape back, the profile of the seam can be retraced at the same speed it was recorded.

DESCRIPTION OF THE PREFERRED EMBODIMENTS

Figure 1:
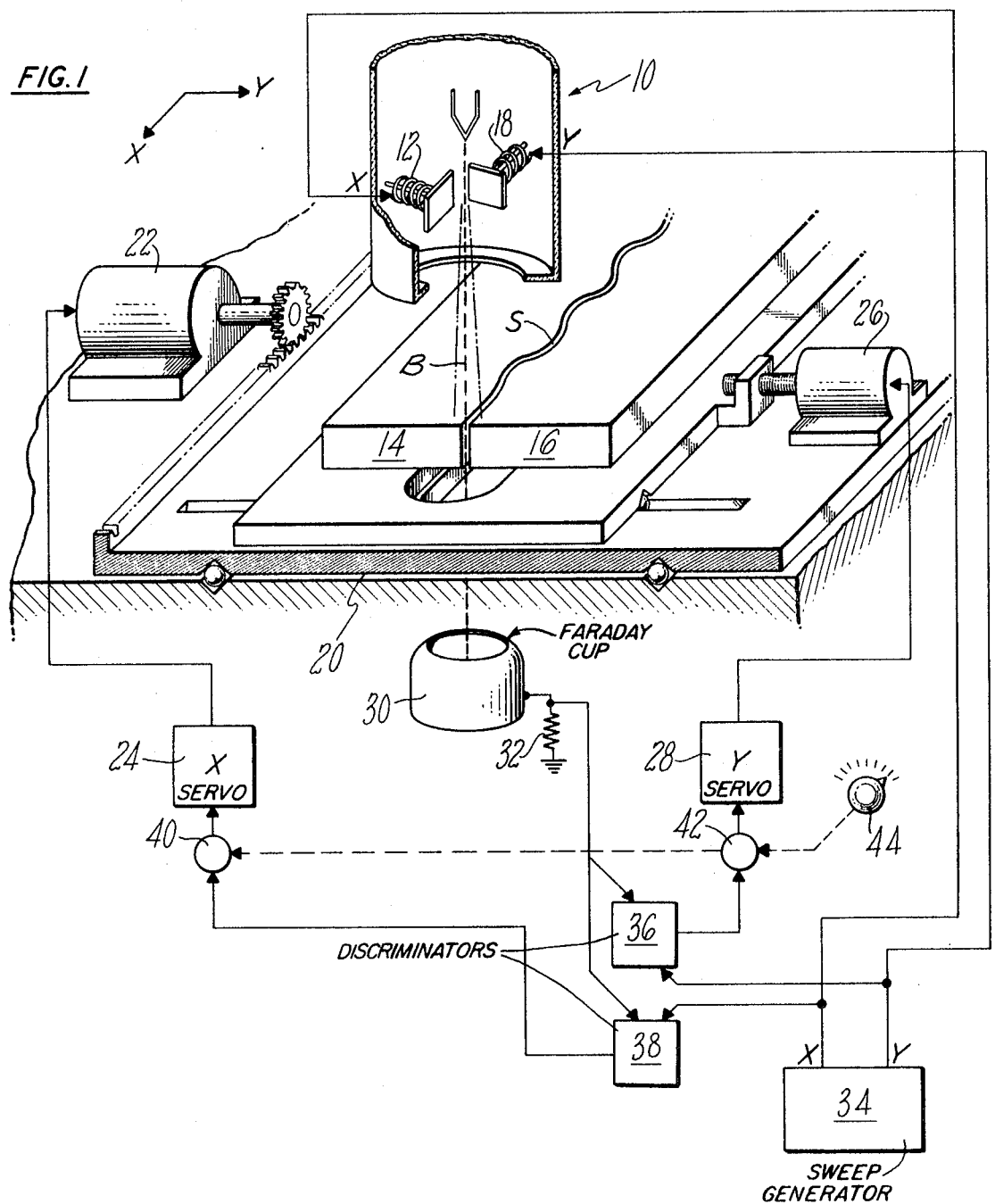
FIG. 1 is a simplified schematic representing the important components of one embodiment of the invention.

Referring to FIG. 1, an electron beam B is shown emanating from an electron beam gun generally designated 10. Electromagnetic deflection coils 12 cause deflection of the beam in a direction designated X which is generally parallel to a seam S between workpieces 14 and 16. A second set of coils 18 cause the beam to be deflected in the orthogonal Y direction or transverse to the seam as pictured in FIG. 1. The workpieces 14 and 16 are mounted on a worktable 20 which is schematically shown to be movable in the X and Y directions. The worktable is moved in the X direction by a servomotor 22 which is driven by servoamplifier 24. The worktable is moved in the Y direction by a servomotor 26 driven from servoamplifier 28. A Faraday cup 30 is positioned below the workpieces 14 and 16 in the vicinity of the weld seam S. The Faraday cup 30 will detect the electrons passing through the seam and impinging on the cup by the discharging current through resistor 32. A voltage developed across the resistor 32 by the discharging current will take the form of a pulse each time the beam impinges on the cup 30.

In order to deflect the beam B periodically across the seam S, a circular sweep generator 34 is connected to the magnetic deflection coils 12 and 18. The sweep generator has two outputs which provide sinusoidal voltages having a phase difference of 90° for sweeping the beam in a circular path on the workpieces. The X output is connected to the X deflection coils 12 and the Y output is connected to the Y deflection coils 18.

A Y-discriminator 36 and an X-discriminator 38 are each connected to the resistor 32 which develops the beam detection pulses from the Faraday cup 30. Each discriminator is respectively connected to the X and Y sweep voltages provided by the sweep generator 34. The discriminators include sample-and-hold circuits which detect and hold the X or Y voltages at the instant the beam pulse is detected. The sampled voltages are supplied to the corresponding servoamplifiers 24 and 28 through gain adjust potentiometers 40 and 42. These potentiometers are ganged together and are operated from a feed rate adjust knob 44. The setting of the feed rate adjust knob will, through potentiometers 40 and 42, establish the welding speed caused by the composite motion of servomotors 22 and 26.

Figure 2:
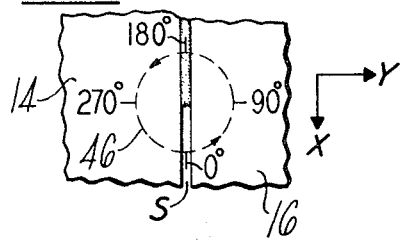
FIG. 2 is a partial view of the seam and workpieces showing the phase relationship of the sweep on a circular sweep path.

Reference to FIG. 2 discloses the seam and workpieces at a given instant during a tracking and welding operation. The dotted line 46 represents the circular path swept by the beam under the control of sweep generator 34 of FIG. 1. If the Y phase output is used as a standard, the phase relationships of the beam sweep are as shown in FIG. 2. The sweep path 46 intersects the seam at the 0° and 180° phase points. The shaded portion of the seam from the center of the circular sweep path and extending beyond the 180° phase point represents a completed weld bead. This condition could exist where the tracking process is performed alternately with the welding operation. Such a result can be obtained by periodically switching the beam from a high intensity welding mode in which the beam remains centered on the seam as the workpieces are moved under the beam to a low intensity tracking mode in which the beam is rapidly swept along the circular path to locate the seam for the subsequent welding operation. By sweeping the beam very rapidly in the circular path and switching back to the welding mode, the weld can be made to appear as if the beam was continuously held in the welding mode. If the beam is swept at a much higher speed along the circular path than the beam is moved during the welding mode, the necessity for a switch between high and low intensities can be avoided and no appreciable melting or damage to the workpieces along the scanning path will occur.

If desired, another high intensity beam operating continuously in the welding mode can be caused to follow a tracking beam which continuously operates in the tracking mode. In such case, the welding beam should closely trail the tracking beam at a distance slightly greater than the radius of the scanning path so that both beams follow essentially the same track.

If desired, the tracking information can be simply stored on a tape for controlling a high intensity welding beam at any desired future time.

Figure 3:
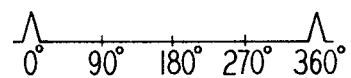
FIG. 3 shows the beam detection pulses produced by a seam positioned as in FIG. 2.
Figure 4:
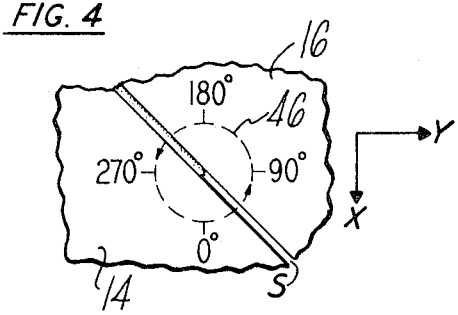
FIG. 4 is similar to FIG. 2 with the seam running at an angle to the sweep references.
Figure 5:
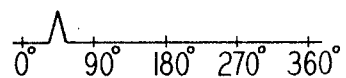
FIG. 5 shows the beam detection pulses produced by the seam position shown in FIG. 4.

In the case where the beam alternates between the welding and tracking modes, the Faraday cup 30 will only detect the tracking beam as it traverses the seam at its position ahead of the weld bead. For example, in FIG. 2, the beam would only be detected at the 0° phase angle and a pulse at the 180° phase would be blanked since the beam cannot penetrate the closed weld seam. FIG. 3 represents the pulse as it would be detected under the conditions shown in FIG. 2. A pulse would appear once each sweep cycle. In these circumstances, the Y discriminator 36 of FIG. 1 would supply zero volts or null signal to the amplifier 28 which in turn would hold motor 26 at zero velocity. At the same time, the X discriminator 38 would supply a maximum signal to amplifier 24 which in turn would drive motor 22 at 100 percent of the welding speed established by feed rate adjust knob 44. It will be understood from FIGS. 4 and 5 that when the seam is not aligned with the X direction, the beam detection pulse will be shifted from the 0° phase angle as in FIG. 5 and the Y discriminator will correspondingly supply a signal of appropriate polarity and magnitude to the servoamplifier 28. The amplifier 28 will drive the motor 26 in the appropriate direction to follow the seam. At the same time, the speed of the servomotor 22 would be decreased. In FIG. 4, the seam runs at a 45° angle to the X direction and consequently the beam detection pulses shown in FIG. 5 are now positioned at the 45° phase angle. In this condition, the servoamplifiers 24 and 28 would supply drive signals at an approximate value of 0.7 times the maximum speed signal. This would result in a relative motion between the workpieces and the beam equal to the maximum feed rate selected by knob 44.

It will be understood that where a single beam performs both the tracking and welding operations, the repetition rate of the tracking operation should be selected to provide tracking information at intervals which are small compared to the rate at which irregularities in the weld seam will be detected. Additionally, the diameter of the scanning path should be selected such that the tracking information derived from the system reflects the significant deviations of the seam. It would, therefore, be desirable that the frequency of the tracking operation and the diameter of the scan path be adjustable for various welding conditions.

It will be further understood that the sweep path need not be a perfect circle. It could be an ellipse or any other path which may be suitable to detect the curvature of the seam. In certain situations, it may be desirable to sweep the beam through a semicircle centered at the desired workpoint or possibly a linear path displaced from the workpoint in the direction of travel of the advancing beam. In either of these situations, the detection of the beam pulse can be correlated with the beam sweep so that the location of the seam with respect to the workpoint can be determined.

It may also be desirable to use different types of detectors. For example, a cup positioned above the workpiece and having an aperture through which the beam can operate may be used to detect secondary emission as the beam sweeps across the weld seam. Such a cup is described more clearly in U.S. Pat. No. 3,426,174. In another embodiment of the invention, it is possible to develop a pulse similar to the beam detection pulse by measuring the variation in current through the workpieces to a ground potential. These latter embodiments may be preferred particularly where there is danger of a high intensity welding beam destroying or damaging a Faraday cup positioned below the workpiece.

Figure 7:
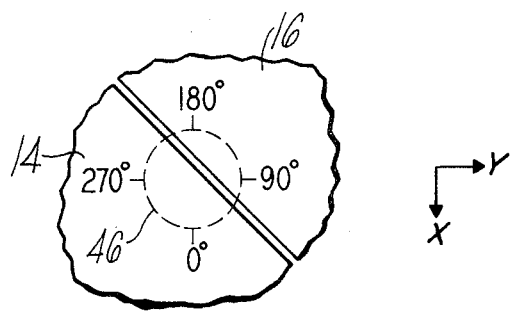
FIG. 7 is a partial view of an open seam and the workpieces showing a circular sweep path not centered on the seam.
Figure 8:
FIG. 8 shows the beam detection pulses produced by the open seam in FIG. 7.
Figure 6:
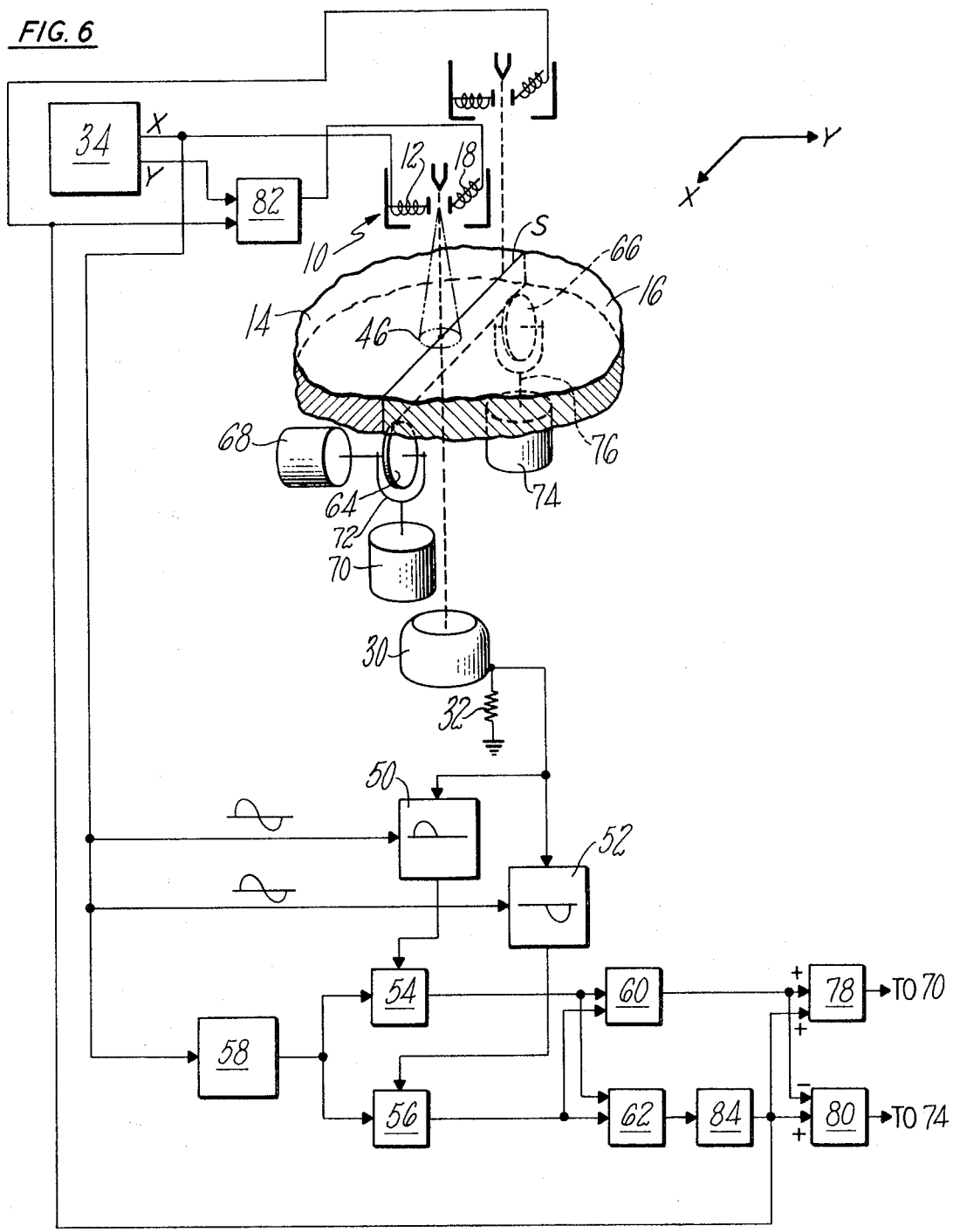
FIG. 6 is a simplified schematic representing the important components of another embodiment of the invention.

FIG. 6 shows an alternate embodiment of the invention which provides additional tracking information concerning both the direction of the seam and the lateral deviation of the tracking beam from the precise center of the seam. Where a separate tracking beam is used to continuously perform the tracking operation, two pulses will be detected by the Faraday cup for each cyclic sweep of the beam. This situation is shown in FIGS. 7 and 8. FIG. 7 shows the workpieces 14 and 16 and the circular sweep path 46 which is not centered precisely on the seam. FIG. 8 shows the beam detection pulses superimposed on the Y phase sweep excitation. It will be noted from FIG. 2 that if an open seam is precisely centered with respect to the sweep circle, the phase difference between the beam pulses will be 180°. Furthermore, it will be noted from FIG. 7 that the direction of the seam through the sweep circle is uniquely associated with the average of the two phase angles at which the beam is detected. The difference of the phase angles at which the beam is detected can be used as a control signal to determine the lateral deviation of the tracking beam from the center of the seam and the average value of the sweep angles can be used to determine the direction of the seam with respect to the sweep circle. The apparatus of FIG. 6 is employed to develop this information.

In FIG. 6, the workpieces 14 and 16 are shown with the tracking beam impinging in the vicinity of a desired workpoint. As the beam is driven by the circular sweep generator 34, the Faraday cup 30 detects two pulses at each intersection of the seam and the circular sweep path. The beam pulses develop a voltage across resistor 32 which is simultaneously fed to gate circuits 50 and 52. The two gate circuits 50 and 52 are triggered alternately on and off by the X sweep voltage from sweep generator 34. During the positive half cycle of the X sweep voltage, the beam will sweep from the 270° phase through the 0° phase to the 90° phase as seen in FIG. 7. At the same time, gate 50 is opened and gate 52 is closed. During the negative portion of the X sweep cycle, the beam sweeps from the 90° phase through the 180° phase to the 270° phase. During this portion of the sweep cycle, gate 52 is opened and gate 50 is closed. Therefore, gates 50 and 52 will be alternately opened and closed to permit the beam pulses to pass. The pulses passing through gate 50 will correspond to intersections of the seam and sweep path at positions generally in advance of the tracking beam while pulses passing through gate 52 will correspond with intersections of the seam and sweep path at positions behind the advancing beam.

The pulses from gates 50 and 52 are respectively supplied to sample-and-hold circuits 54 and 56. In addition to controlling gates 50 and 52, the X sweep voltage also triggers a sawtooth generator 58 which provides a linear output proportional to the X-phase angle during each cycle of the beam sweep. The output of the generator 58 is simultaneously supplied to sample-and-hold circuits 54 and 56. The beam pulses supplied from gates 50 and 52 causes circuits 54 and 56 to sample the sawtooth voltage at the instant that the pulse from gates 50 and 52 is passed. Consequently, the outputs of circuits 54 and 56 will be respectively proportional to the phase angle at which the forward and rearward beam pulses are detected.

The outputs of circuits 54 and 56 are both supplied to an averaging circuit 60 and subtracting circuit 62. The averaging circuit 60 sums each of the voltage signals and provides an output which is proportional to the average of the two phase angles. The subtracting circuits subtracts the voltages from circuits 54 and 56 and provides an output proportional to the difference of each of the phase angles. The output, therefore, from averaging circuit 60 is unique to the direction of the seam with respect to the circular sweep, and the output of subtracting circuit 62 is proportional to the lateral deviation of the circular sweep path from the center of the seam. These two outputs can be respectively employed to drive the workpieces in the direction of the seam and to center the seam with respect to the circular sweep path.

In order to accomplish the movement of the workpieces in the direction of the seam and to center the workpieces with respect to the circular sweep path, a forward driving wheel 64 and a rear guide wheel 66 are shown in frictional contact with the workpieces. It is also possible that these wheels could engage a worktable to which the workpieces 14 and 16 are securely fastened; however, the worktable has been omitted in FIG. 6 for simplicity. A drive motor 68 rotates drive wheel 64 at a constant speed. A steering servo 70 supports drive wheel 64 through a steering fork 72 and controls the angular position of wheel 64 and consequently the direction of motion of the workpieces 14 and 16 at their point of contact with wheel 64. A similar steering servo 74 and steering fork 76 control wheel 66 and the motion of the workpieces at their point of contact with wheel 66. It will be understood that if wheels 64 and 66 are parallel to the plane of the seam as shown, the workpieces will advance directly under the tracking beam in the X direction. If the wheels 64 and 66 are rotated at an angle to the X direction and remain parallel to one another, the workpieces will translate laterally to the X direction at an angle depending upon the angular position of the wheels. If the wheels 64 and 66 are rotated differentially, that is if one wheel is rotated clockwise while the other wheel is rotated counterclockwise, the workpieces 14 and 16 will rotate with respect to the X and Y directions as they translate under the tracking beam. By a combination of the rotational and translational motions of the workpieces under the proper control of wheels 64 and 66, the workpieces can be guided under the tracking beam so that the beam will follow the seam.

Since the output of averaging circuit 60 represents the desired direction of the workpiece motion, this output is fed to servoamplifiers 78 and 80 which in turn control steering servos 70 and 74 respectively. As mentioned above, the servos 70 and 74 must rotate the wheels 64 and 66 differentially in order to rotate the workpieces 14 and 16 and the seam into alignment with the X direction. Once the seam has been aligned with the X direction, the seam will advance under the tracking beam at a constant speed set by motor 68.

As mentioned above, the output of subtracting circuit 62 represents the lateral deviation of the sweep circle from the center of the seam. In order to position the seam coincidentally with the center of the sweep circle, the workpieces must be translated laterally to the X axis as shown in FIG. 7. To accomplish this motion, servomotors 70 and 74 must be rotated in the same direction depending on which side of the sweep circle the beam is displaced. The output of circuit 62 is also connected to servoamplifiers 78 and 80 through an integrator to be described below. The control signals from circuits 60 and 62 are combined within the servoamplifiers 78 and 80 and the single output of each amplifier represents the resultant of the combined inputs. The control motions, therefore, of the wheels 64 and 66 represent the combination of the command signals and provide both translation of the workpieces under the tracking beam and lateral positioning of the seam coincident with the center of the sweep circle.

In a further refinement to the control circuitry of FIG. 6, the lateral displacement error signal emanating from circuit 62 can be applied to an integrator circuit 84 and from this integrator circuit to the servoamplifiers 78 and 80, summing amplifier 82 and the deflection coils of the welding beam. This integrated error will shift the sweep circle and the welding beam toward a position centered with respect to the seam while the servoamplifiers drive the workpieces and the seam toward a position centered with respect to the electron beam gun 10. By this feedback process, the tracking beam and the welding beam will be held close to a centered position on the seam but the integrator can still develop error signals for centering the workpieces with the guns.

It will be understood that with the drive motor 68 operating at a constant speed, the translation of the circular sweep path along the work seam will be substantially constant whenever the seam is aligned with the X direction. The control signals supplied by circuits 60 and 62 can be recorded and later played back to reproduce the tracking motions of the workpieces under a high intensity welding beam. In this case, it is particularly desirable to position the drive wheel 64 directly under the center of the sweep circle to reproduce a constant welding speed. If desired, a separate welding beam could be caused to operate simultaneously with the tracking beam at a position on the weld seam slightly behind the circular sweep path. In such an embodiment, it may be desirable to position guide wheel 66 close to the impingement point of the welding beam and permit wheel 66 to be the driving wheel rather than wheel 64. This would insure that the relative speed of the workpieces with respect to the welding beam would be constant. The wheels 64 and 66 in this case are most desirably positioned at locations equidistant from the center of the sweep circle.

It will be understood that still further embodiments of the invention could be employed without deviating from the spirit of the invention. For example, instead of employing the guide wheels 64 and 66 to control the motion of the workpieces 14 and 16, servomotors similar to those shown in FIG. 1 could also be used with a different circuitry for driving the servomotors 22 and 26. Such circuitry would include a resolving network for breaking the command signals from circuits 60 and 62 into proper components in the X and Y directions. The invention, therefore, is not limited to the specific embodiments illustrated and described, but may be used in other ways without departure from its spirit as defined by the following claims.

I claim:

1. A method for tracking a seam formed between abutting workpieces, the said seam including a space between said workpieces which is sufficiently large to permit electrons to pass therethrough, comprising the steps of generating and directing a beam of electrons toward said workpieces at a point in the vicinity of said seam, generating first and second sinusoidal deflection voltages 90° removed in phase deflecting said beam in response to said deflection voltages along a circular scanning path about said point so that said beam intersects said seam at least at one point along said scanning path, detecting the electrons passing through said seam upon intersection of said beam therewith and generating a detection signal in response thereto, sampling said deflection voltages in response to said detection signal to produce first and second position signals indicative of the direction of said intersection relative to said point along two orthogonal axes, and causing relative movement between said beam and said workpieces in the directions defined by said position signals to cause said electron beam to follow said seam.

2. The method of claim 1 wherein said first and second deflection voltages are sampled in response to said detection signal to produce said first and second position signals indicative of the direction of intersection of said beam with said seam relative to said point in each of said first and second directions respectively, the relative movement between said beam and said workpieces being produced simultaneously in both said first and second directions at a speed in each direction proportional to the relative magnitudes of said first and second position signals.

3. The method of claim 1 in which said beam of electrons is directed at a point directly on said seam.

4. The method of claim 1 in which said beam intersects said seam at two points along said scanning path, each said intersection producing a detection signal in response thereto, said first and second deflection voltages being sampled in response to each said detection signal to produce said first and second position signals, averaging said first and second position signals to determine the angular orientation of said seam relative to said point, subtracting said first and second position signals to determine the lateral deviation of said seam from said point, and causing relative motion of said beam and said workpieces in a direction parallel to said angular orientation direction and normal to said lateral deviation direction to cause said electron beam to follow said seam.

5. Apparatus for tracking a seam formed between abutting workpieces, the seam including a space between said workpieces which is sufficiently large to permit electrons to pass therethrough, comprising means for generating and directing a beam of electrons at said workpieces at a point in the vicinity of said seam, a sweep generator producing first and second sinusoidal deflection voltages, one of said deflection voltages being 90° removed in phase from the other deflection voltage for deflecting said beam along two orthogonal axes, means responsive to the combination of said deflection voltages for deflecting said beam along a circular scanning path about said point so that said beam intersects said seam at at least one point, detection means positioned beneath said seam for detecting electrons passing through said seam upon intersection of said electron beam with said seam and producing a detection signal in response thereto, sampling means connected with said sweep generator and with said detection means and producing a pair of position signals indicative of the direction of said intersection relative to said point along each of said orthogonal axes respectively, and means responsive to said position signals for moving the beam and workpieces relative to each other along both said axes to cause said beam to follow said seam.

6. Apparatus as in claim 5 in which said sampling means comprises a first discriminator circuit and a second discriminator circuit, said first discriminator circuit being connected to receive one of said sinusoidal deflection voltages and said detection signal and producing a first position signal indicative of the magnitude of deviation of said intersection relative to said point along one said orthogonal axis, said second discriminator circuit being connected to receive the other of said sinusoidal deflection voltages and said detection signal and producing a second position signal indicative of the magnitude of deviation of said intersection relative to said point along the other said orthogonal axis, and servo means connected to receive each of said first and second position signals for moving said workpieces relative to said beam at a speed proportional to the respective magnitude of each said position signal.

7. Apparatus as in claim 5 in which said beam intersects said seam at two points and generates two detection signals, and in which said sampling means comprises first and second gating circuits, said first gating circuit being connected to receive one of said sinusoidal deflection voltages and said detection signals and to pass one of said detection signals therethrough during the positive half-cycle of said sinusoidal voltage, said second gating circuit being connected to receive said one sinusoidal deflection voltage and said detection signals and to pass the other of said detection signals therethrough during the negative half-cycle of said sinusoidal voltage, means for generating a linear sawtooth voltage proportional to the phase angle of said one sinusoidal deflection voltage, first and second sample-and-hold circuits, said first sample-and-hold circuit receiving said sawtooth voltage and the detection signal passed by said first gating circuit and producing a first sampling voltage proportional to the phase of the said one sinusoidal deflection voltage at the time of generation of said one detection signal, said second sample and hold circuit receiving said sawtooth voltage and the detection signal passed by said second gating circuit and producing a second sampling voltage proportional to the phase of said one sinusoidal deflection voltage at the time of generation of said other detection signal, an averaging circuit receiving said first and second sampling voltages and producing an averaging signal proportional to the average of said sampling voltages, a subtracting circuit receiving said first and second sampling voltages and producing a subtraction signal proportional to the difference between said sampling voltages, and means for combining said averaging signal and said subtraction signal to produce said position signals.